(12) United States Patent
Ungerboeck

(10) Patent No.: US 7,697,615 B2
(45) Date of Patent: *Apr. 13, 2010

(54) SUBDIMENSIONAL SINGLE-CARRIER MODULATION

(75) Inventor: Gottfried Ungerboeck, Langnau am Albis (CH)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/277,516

(22) Filed: Nov. 25, 2008

(65) Prior Publication Data

US 2009/0074104 A1    Mar. 19, 2009

Related U.S. Application Data

(63) Continuation of application No. 10/909,661, filed on Aug. 2, 2004, now Pat. No. 7,457,364, which is a continuation of application No. 09/652,721, filed on Aug. 31, 2000, now Pat. No. 6,778,611.

(60) Provisional application No. 60/151,680, filed on Aug. 31, 1999.

(51) Int. Cl.
*H04L 27/00* (2006.01)

(52) U.S. Cl. .................. 375/259; 375/285; 375/296; 375/348

(58) Field of Classification Search ............ None
See application file for complete search history.

(56) References Cited

U.S. PATENT DOCUMENTS

| 6,327,311 B1 | 12/2001 | Ojard |
| 2002/0106035 A1 | 8/2002 | Harikumar et al. |

FOREIGN PATENT DOCUMENTS

| EP | 0 683 576 A1 | 11/1995 |
| WO | WO 98/45970 | 10/1998 |
| WO | WO 98/57468 | 12/1998 |

OTHER PUBLICATIONS

Georgious B. Giannakis (hereinafter Giannakis), "Basis Expansion Models and Diversity Techniques for Blind Identification and Equalization of Time-Varying Channels", Proceedings of the IEEE, vol. 10, Oct. 1998.

Hui Liu (Herinafter Liu), "Deterministic Approaches for Blind Equalization of Time-Varying Channels with Antenna Arrays", IEEE 1998.

*Primary Examiner*—David C Payne
*Assistant Examiner*—Leon Flores
(74) *Attorney, Agent, or Firm*—McAndrews, Held & Malloy, Ltd.

(57) ABSTRACT

A method for modulating a sequence of data symbols such that the transmit signal exhibits spectral redundancy. Null symbols are inserted in the sequence of data symbols such that a specified pattern of K data symbols and N−K null symbols is formed in every period of N symbols in the modulated sequence, N and K being positive integers and K being smaller than N.

24 Claims, 4 Drawing Sheets

Example 1: N = 7, K = 6

Example 2: N = 4, K = 2, Ψ = {0,1}

SUBDIMENSIONAL SINGLE-CARRIER MODULATION

CROSS-REFERENCE TO RELATED APPLICATION(S)

The present application is a continuation of U.S. patent application Ser. No. 09/652,721, filed Aug. 31, 2000, which claims priority on the basis of the provisional application Ser. No. 60/151,680, entitled "Subdimensional Single-Carrier Modulation," filed on Aug. 31, 1999, the contents of which are herein incorporated by reference.

BACKGROUND OF THE INVENTION

1. Field of the Invention

The present invention relates generally to methods and systems for providing spectral redundancy while modulating information to be transmitted with a single carrier signal.

2. Description of Related Art

Narrowband interference and deep spectral notches in the transmission channel of single-carrier modulation (SCM) systems are common impairments in high-speed digital transmission over twisted-pair subscriber lines, home phone-line networks, upstream transmission in CATV cable systems, and wireless communication systems. For example, these impairments can occur in Very-High Speed Digital Subscriber Line (VDSL) systems, which are currently in a definition phase. In a VDSL system, signals will be transmitted over twisted-pair subscriber lines in the frequency band from a few 100 kHz up to 20 MHz. Cable attenuation and crosstalk from other pairs in the same cable binder are the main impairments. Deep spectral notches in the channel transfer function may be caused by bridged taps. In addition, spectral notches may be intentionally introduced at the transmitter to prevent radiation from the cable into certain RF bands (such as amateur radio bands). Narrowband RF interference must be suppressed by notching the corresponding bands at the receiver. The characteristics of the narrowband impairments are often a priori unknown at the receiver and may change over time.

Adaptive decision-feedback equalization (DFE) is conventionally used to deal with these impairments. Good performance is achieved if interference levels and the depth of spectral notches are moderate, or the width of impaired spectral regions is small compared to the Nyquist bandwidth. However, if the impairments are more severe, DFE requires long feedforward filter and feedback filters, and system performance, as measured by the mean-square error, is generally degraded. Moreover, the coefficients of the feedback filter tend to become large and unending error propagation can occur.

This error propagation problem can be avoided by performing the feedback filtering operation together with modulo signal reductions in the transmitter, instead of the receiver. This so-called "preceding" technique allows obtaining a substantially intersymbol interference (ISI) free signal at the output of the feedforward equalizer in the receiver. Precoding also enables the use of trellis-coded modulation (TCM) or similar signal-space coding techniques on ISI channels. However, the capabilities of DFE and preceding are limited. If the impaired spectral regions are too wide, a SCM system must avoid these regions. Moreover, preceding requires sending the feedback filter coefficients from the receiver to the transmitter.

Thus, there is a need for SCM systems which can deliver practically ISI-free signals in spite of narrowband interference and deep spectral notches in the transmission channel, and which do not have the problems associated with DFE and preceding.

SUMMARY OF THE INVENTION

The present invention provides a method and a system for modulating a sequence of data symbols such that the modulated sequence has spectral redundancy. Null symbols are inserted in the sequence of data symbols such that a specified pattern of K data symbols and N−K null symbols is formed in every period of N symbols in the modulated sequence, N and K being positive integers and K being smaller than N. The positions of the K data symbols within every period of N symbols are defined by an index set.

The present invention also provides a method for processing a receive sequence. The receive sequence corresponds to a transmit signal having a specified pattern of K data symbols and N−K null symbols within every period of N symbols. N and K are positive integers and K is smaller than N. The positions of the K data symbols within every period of N symbols are defined by an index set. The receive sequence is equalized with a time-varying equalizer having K sets of coefficients. The K sets of coefficients are used periodically in accordance with the index set, to produce an equalized receive sequence substantially free of intersymbol interference.

BRIEF DESCRIPTION OF THE DRAWINGS

These and other features, aspects and advantages of the present invention will be more fully understood when considered with respect to the following detailed description, appended claims and accompanying drawings, wherein:

DETAILED DESCRIPTION OF THE INVENTION

The present invention provides a method and a system for reliable communication in the presence of narrowband interference and deep spectral notches in the transmission channel. Unlike conventional methods, the method of the present invention does not have the problems associated with DFE and precoding (discussed in the Background section).

The method of the present invention is hereinafter referred to as "Subdimensional Single-Carrier Modulation" (SD-SCM) technique, and the corresponding system is hereinafter referred to as SD-SCM system.

Generally, subdimensional modulation means that signals are transmitted in a subspace of the signal space supported by a given channel. A channel with single-sided bandwidth of W hertz admits a signal space of 2W real signal dimensions per second. This maximum rate of dimensions per second can be achieved in many ways. Sending W=1/T complex symbols per second by quadrature-modulated SCM (with ideal "brick wall" pulse shaping filter) is one such example. Restricting modulation to subspaces of the supported signal space can also be accomplished in many ways. The method of the present invention provides one way of restricting the modulation to a K-dimensional subspace of the supported N-dimensional signal space. The important aspect of the present invention is to send signals with spectral support over the full bandwidth of the channel and achieve spectral redundancy by modulation constraints. Spectral redundancy can then be exploited in the receiver to recover the transmitted symbols from the spectral regions that have good transmission characteristics.

In a SD-SCM system, the transmitter inserts null symbols periodically in the sequence of data symbols. In the simplest case, one null symbol is inserted after every N−1 data symbols. In the general case, in every period of N symbols, a specified pattern of K data symbols and N−K null symbols is transmitted. The receiver includes a time-varying linear feedforward equalizer with K sets of coefficients. Each of the K sets of coefficients is periodically used to equalize the K data symbols in every N-symbol period. It will be shown that ISI-free symbol transmission can be achieved if the combined bandwidth of severely notched or disturbed spectral regions does not exceed (N−K)/N×(1/T), where 1/T denotes the Nyquist bandwidth.

The SD-SCM technique does not preclude adding a decision feedback filter in the receiver, or performing preceding in the transmitter. However, DFE or preceding are not essentially required in a SD-SCM system.

The coefficients of the time-varying feedforward equalizer can be adjusted adaptively using the least-mean-squares (LMS) algorithm. The required coordination between the transmitter and the receiver of a SD-SCM system is minimal. Blind equalization is also possible.

Figure 1:
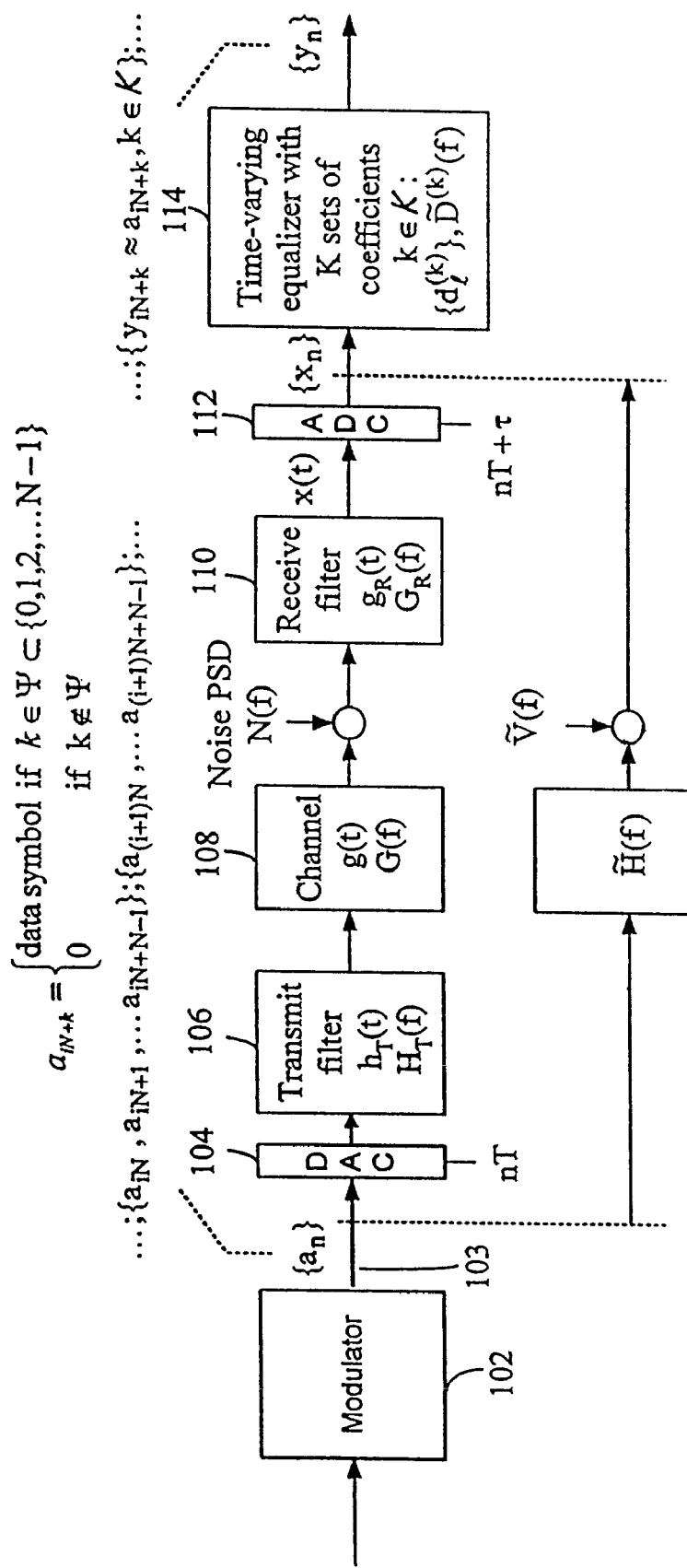
FIG. 1 illustrates an exemplary complex-baseband model of a SD-SCM system.

FIG. 1 illustrates an exemplary complex-baseband model of a SD-SCM system. The symbol response of the transmit filter and the impulse responses of the channel and the receive filter are denoted by $h_T(t)$, $g(t)$, and $g_R(t)$, respectively. Generally, these functions are complex valued. The corresponding Fourier transforms are $H_T(f)$, $G(f)$, and $G_R(f)$. Complex symbol transmission at modulation rate 1/T is assumed.

Referring to FIG. 1, a modulator 102 accepts information bits at its inputs and maps them to data symbols. The modulator 102 also inserts null symbols in the sequence of the data symbols such that a specified pattern of K data symbols and N−K null symbols is formed in every period of N symbols. N and K are positive integers and K is smaller than N. The positions of the K data symbols within every period of N symbols are defined by an index set $\Psi$ which is a subset of the set $\{0, 1, 2, \ldots, N-1\}$:

$$\Psi = \{k_0, k_1, \ldots k_{K-1}; 0 \leq k_i \leq N-1, k_i \neq k_j \text{ for } i \neq j\} \quad (1)$$

It is assumed that $\Psi$ is free of subperiods; otherwise, an N-symbol period can be shortened to contain only one subperiod with correspondingly smaller values of N and K. Without loss of essential generality, one may require that $k_0=0$.

The symbol sequence $\{a_n = a_{iN+k}\}$ at the output 103 of the modulator 102 is of the form $$a_{iN+k} = \begin{cases} \text{data symbol} & \text{if } k \in \Psi \\ 0 & \text{if } k \notin \Psi \end{cases}, i \in Z, 0 \leq k \leq N-1,$$

where Z denotes the set of integers.

The symbol sequence $\{a_n\}$ is converted to an analog transmit signal by an digital-to-analog converter 104 operating at a clock times nT and a pulse shaping transmit filter 106. The transmit filter may be a raised cosine filter. The communication channel 108 generally distorts the transmitted signal and adds noise to it. For example, in the case of metallic twisted-pair cables, increasing attenuation with frequency and reflections of unused branching sections of the communication line (bridged taps) cause signal distortion. At higher frequencies, bridged taps can lead to deep notches in the spectral of the received signal. Noise may be due to near-end (NEXT) and/or far-end crosstalk (FEXT) from other cables in the same cable binder, ingress of narrowband radio interference, or disturbances from electric motors and household appliances. In FIG. 1, N(f) denotes the power spectral density of additive noise.

The SD-SCM system may also include in the transmit filter a notch filter to produce notches in spectrum of the transmitted signal at predetermined frequency bands, the notches having an aggregate bandwidth of less than or equal to ((N−K)/N)×(1/T), where 1/T is the Nyquist bandwidth. For example, in VDSL systems such notching may be necessary to prevent egress radiation from a cable into amateur-radio bands.

At the input of the receive filter 110, a continuous time (analog) signal x(t) is received. A sampler 112, i.e., an analog-to-digital converter, samples x(t) at clock times nT+τ and produces a signal sequence $\{x_n\}$. In this case, the time spacing between the sampled signals is equal to T. In other embodiments of the invention the received signal may be sampled at higher rates.

A time-varying equalizer 114 having K sets of coefficients operates on the T-spaced sequence $\{x_n\}$ and produces an output sequence $\{y_n\}$. For every N-symbol period in $\{x_n\}$, the equalizer 114 outputs K equalized signals. In the absence of noise, these K signals will practically be equal to the K data symbols in the original transmit signal, i.e., $y_{iN+k} \approx a_{iN+k}$, $k \in \Psi$, provided the index set $\Psi$ is chosen such that zero-ISI signals can be delivered in the presence of strongly impaired spectral regions of aggregate width of up to (N−K)/(NT) hertz. This can be achieved when the index set $\Psi$ is a "proper set". The definition of a proper set is given in terms of the K×K matrix $A_{K \times K}(L, \Psi)$ defined in Equation (18). If $A_{K \times K}(L, \Psi)$ is non-singular for all possible sets L, then $\Psi$ is called a proper set.

One sufficient condition for a proper set $\Psi$ is that N is a prime number. In this case, $\Psi$ can be of any K-ary subset of $\{0, 1, 2, \ldots, N-1\}$.

Another sufficient condition for a proper set $\Psi$ is that the index set $\Psi$ is equal to $\{k_i = k_0 i \Delta \mod N, i=0, 1, 2, \ldots, K-1\}$, where $0 \leq k_0 \leq N-1$ and $\Delta$ is an integer and such that the greatest common divisor of $\Delta$ and N is 1. In this case, the index set $\Psi$ is called "proper sequential". A special set of this type is obtained when K is equal to N−1. The single null symbol may be inserted anywhere in an N-symbol period.

Examples of proper sets $\Psi$ with $k_{0=0}$ (=$\Psi_0$) are:

$N \geq 2, 1 \leq K \leq N-1, \Delta=1: \Psi_0 = \{0,1,2,\ldots,K-1\}$ $N=8, K=6, \Delta\Delta=3: \Psi_0=\{0,3,6,1,4,7\}=\{0,1,3,4,6,7\}$
(elements reordered)

$N=11, K=8: \Psi_0\{0,2,3,4,5,7,8,9\}$ (N prime).

It is noted that there exists also proper sets of $\Psi$, which do not satisfy one of the above two sufficient conditions, for example:

$N=8, K=3: \Psi=\{0,1,3\}$ $N=10, K=7: \Psi=\{0,1,2,4,5,7,8\}$.

Mathematically, usage of a pattern of K data symbols out of N symbols can be interpreted as K-dimensional subspace modulation in an N-dimensional signal-vector space. The modulation subspace can be rotated by multiplying N-dimensional signal vectors by an arbitrary N×N unitary matrix.

Any pattern that can be expressed as a rotation of a given pattern is considered equivalent to the given pattern for the purpose of the method of the present invention.

When the index set $\Psi$ is a proper set, the time-varying equalizer 114 can suppress strongly impaired spectral regions of aggregate width of up to $(N-K)/(NT)$ hertz while delivering practically zero-ISI signals. This will be shown mathematically later.

The impaired spectral regions do not have to be in connected bands. As long as their aggregate width is less than or equal to $(N-K)/(NT)$ hertz in the Nyquist band $f \in [0, 1/T)$, the time-varying equalizer 114 can produce practically ISI-free signals. Examples illustrating zero-ISI achievement with maximally suppressed bands are shown in FIG. 2A and FIG. 2B.

Figure 2A:
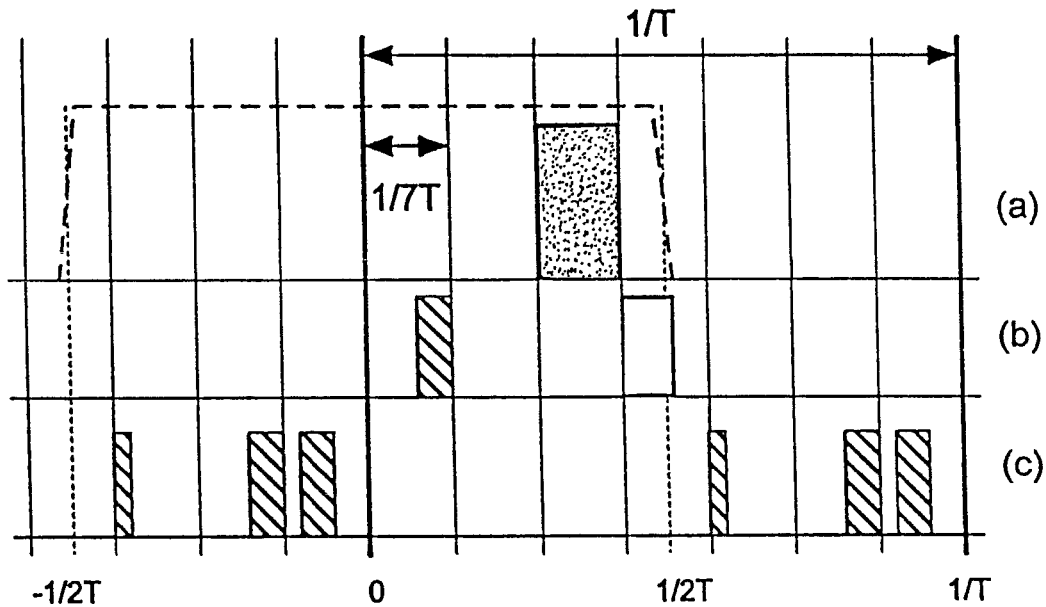
FIG. 2A illustrates examples of maximally suppressed bands for the case N=7, K=6.

FIG. 2A illustrates examples of maximally suppressed bands for the case N=7, K=6. In this case, there are 6 data symbols and a single null symbol in every period of 7 symbols. The maximum aggregate width of strongly impaired spectral regions is $(N-K)/(NT)=1/7T$ hertz. In part (a) of FIG. 2A, the suppressed spectral region in is one sub-band of width $1/7T$. In part (b) of FIG. 2A, the suppressed spectral regions are two non-contiguous regions of unequal widths, the aggregate width of which is equal to $1/7T$. In part (c) of FIG. 2A, the suppressed spectral regions are three non-contiguous regions in the Nyquist band $f \in [0, 1/T)$, the aggregate width of which is equal to $1/7T$.

Figure 2B:
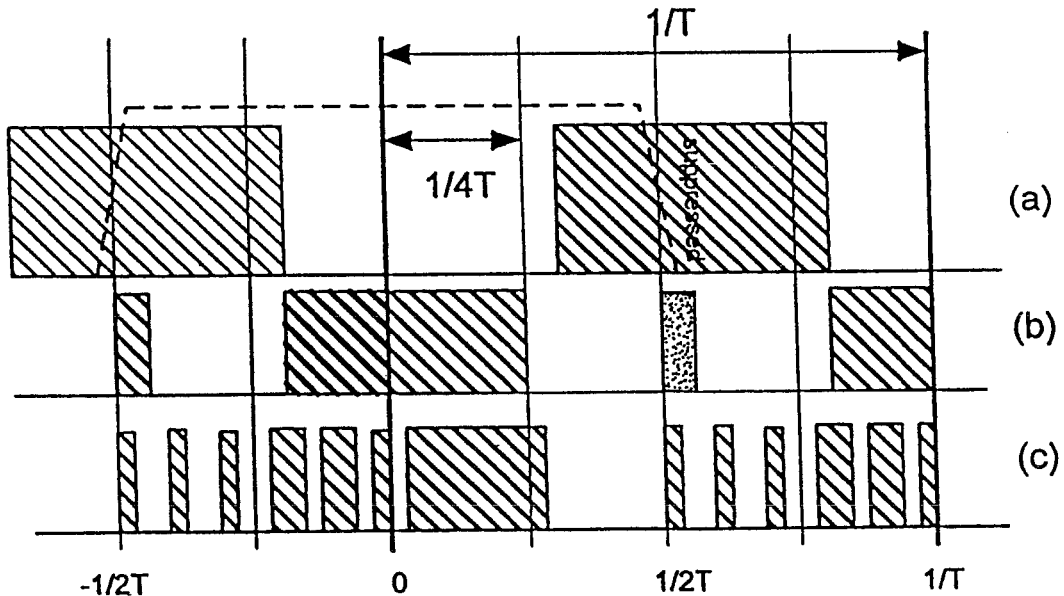
FIG. 2B illustrates examples of maximally suppressed bands for the case N=4, K=2, $\Psi=\{0, 1\}$.

FIG. 2B illustrates examples of maximally suppressed bands for the case N=4, K=2, $\Psi=\{0, 1\}$. In this case, there are 2 data symbols and two null symbols in every period of 4 symbols. As indicated by $\Psi$, the data symbols are at positions 0 and 1 in every 4-symbol period. The maximum aggregate width of strongly impaired spectral regions is $(N-K)/(NT)=1/2T$ hertz. In part (a) of FIG. 2B, the suppressed spectral region in is one band of width $1/2T$. In part (b) of FIG. 2B, the suppressed spectral regions are three non-contiguous regions of unequal widths in the Nyquist band $f \in [0, 1/T)$, the aggregate width of which is equal to $1/2T$. In part (c) of FIG. 2B, the suppressed spectral regions are seven non-contiguous regions in the Nyquist band $f \in [0, 1/T)$, the aggregate width of which is equal to $1/2T$.

The following describes the operation of the time-varying equalizer 114 (FIG. 1) on the T-spaced sequence $\{x_n\}$ with K sets of coefficients. For clarity, the description will be for a specific example. The example is the case N=8, K=3, $\Psi=\{0, 1, 3\}$ (a proper set, as stated above). In one embodiment, the time-varying equalizer 114 (FIG. 1) is a finite impulse response filter of sufficient length M (generally greater than N). For example, M=10. The time-varying equalizer has M−1=9 delay elements. The time-varying equalizer operates on the T-spaced sequence $\{x_n\}$ with K=3 sets of coefficients as follows. The symbols of the sequence $\{x_n\}$ are shifted into the equalizer 114 one symbol at a time. Except for the current symbol, the symbols are stored in the delay elements of the equalizer. The input symbols are multiplied by the coefficients of the currently used set of coefficients. The results are combined to produce an output symbol. The equalizer has 3 sets of coefficients. Each of the 3 sets has 10 coefficients and is used periodically.

The equalizer uses the first set of coefficients, corresponding to k=0, i.e., the first element of $\Psi$, to operate on the following 10 input symbols and outputs symbol $y_{iN}$:

$\{X_{(i-1)N-1} X_{(i-1)N} X_{iN-7} X_{iN-6} X_{iN-5} X_{iN-4} X_{iN-3} X_{iN-2} X_{iN-1} X_{iN}\}$

The equalizer uses the second set of coefficients, corresponding to k=1, i.e., the second element of $\Psi$, to operate on the following 10 input symbols and outputs symbol $y_{iN+1}$:

$\{X_{(i-1)N} X_{iN-7} X_{iN-6} X_{iN-5} X_{iN-4} X_{iN-3} X_{iN-2} X_{iN-1} X_{iN} X_{iN+1}\}$

The equalizer uses the third set of coefficients, corresponding to k=3, i.e., the third element of $\Psi$, to operate on the following 10 input symbols and outputs symbol $y_{iN+3}$:

$\{X_{iN-6} X_{iN-5} X_{iN-4} X_{iN-3} X_{iN-2} X_{iN-1} X_{iN} X_{iN+1} X_{iN+2} X_{iN+3}\}$

Figure 3:
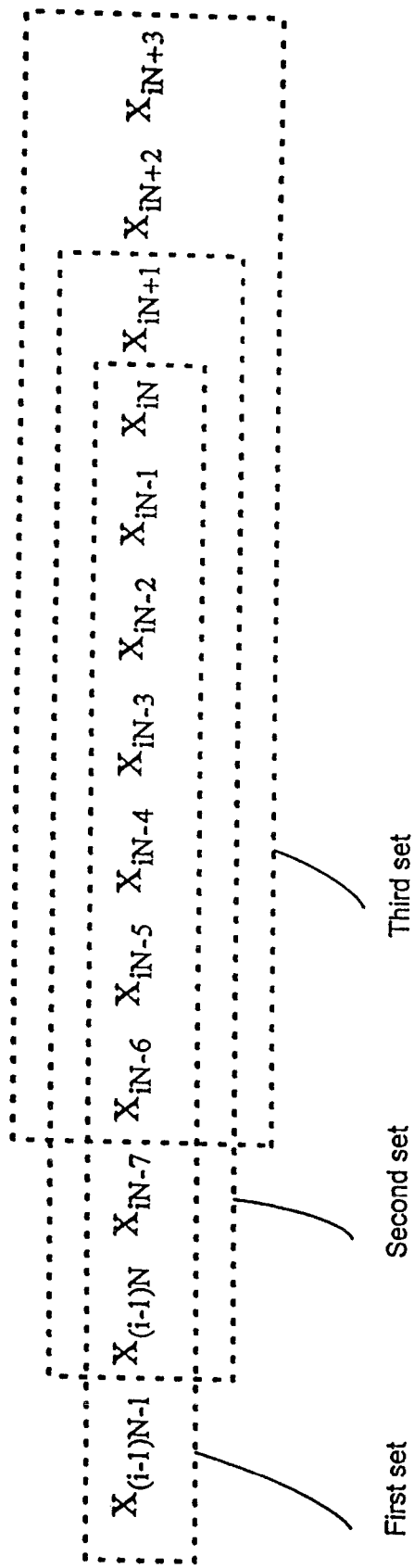
FIG. 3 illustrates the operation of a time-varying equalizer of length on the received signal sequence $\{x_n\}$ for the example N=8, K=3, $\Psi=\{0, 1, 3\}$.

FIG. 3 illustrates the operation of the time-varying equalizer on the input symbol sequence $\{x_n\}$. After the first set of coefficients is used to operate on the 10 input symbols with $x_{iN}$ being the most current input symbol, a new input symbol $x_{iN+1}$ is shifted into the equalizer. The second set of coefficients is then used to operate on the group of 10 input symbols with $x_{iN+1}$ being the most current input symbol. Then, $x_{iN+2}$ is shifted in, but the equalizer does not operate on this group of 10 symbols. Then, $x_{iN+3}$ is shifted in, and the third set of coefficients is used to operate on the group of 10 symbols with $x_{iN+3}$ being the most current input symbol. The elements in the index set $\Psi=\{0, 1, 3\}$ determine at what positions in every N-symbol period of the input sequence the K sets of coefficients are used. In the above example, they are used at positions 0, 1, 3. After the third set of coefficients is used, the first set of coefficients is used again when $x_{(i+1)N}$ is shifted in as the most current input symbol. And the cycle continues.

Figure 4:
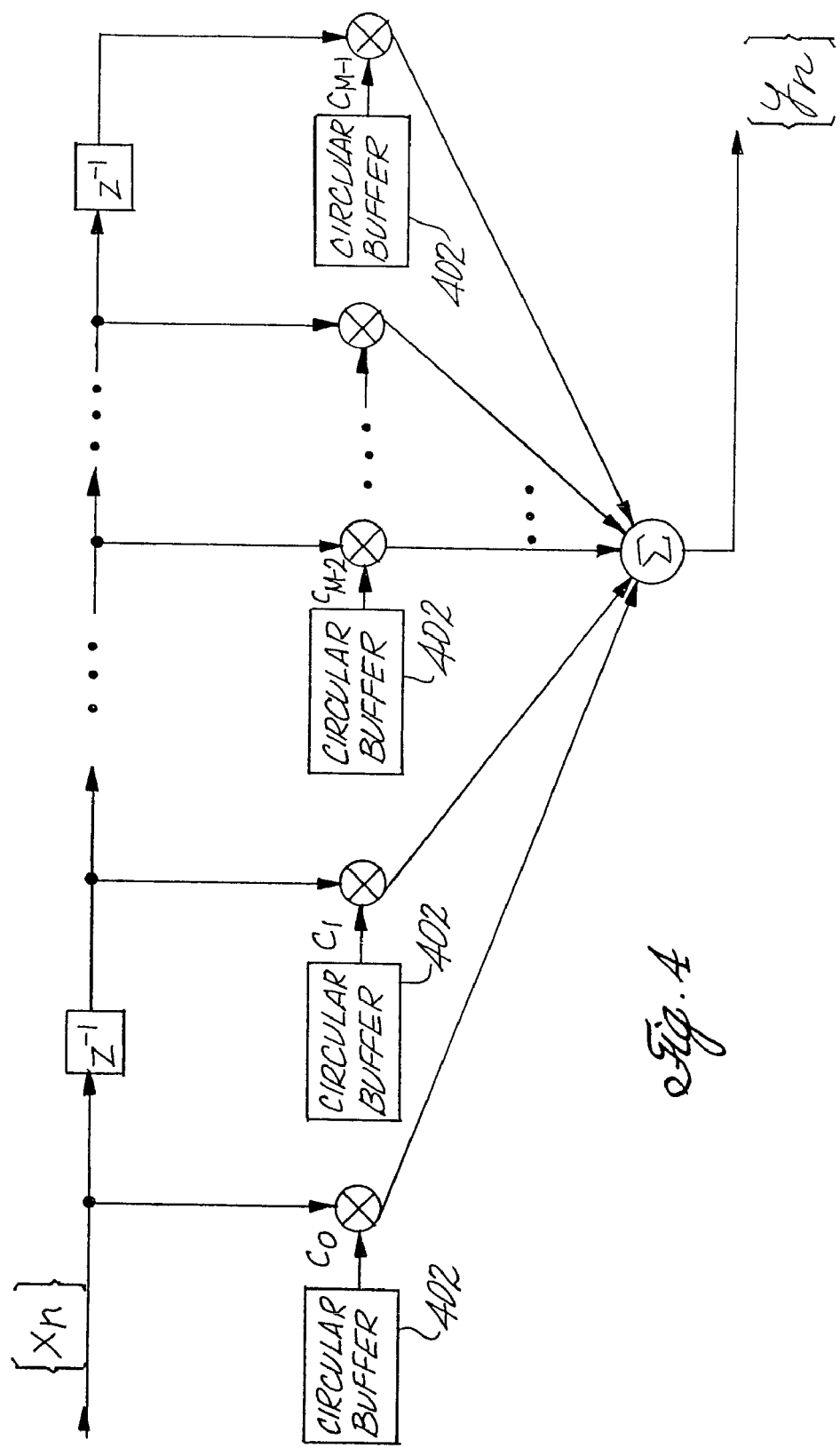
FIG. 4 illustrates an embodiment of the time-varying equalizer 114 (FIG. 1).

FIG. 4 illustrates an embodiment of the time-varying equalizer 114 (FIG. 1). The K sets of M coefficients $\{c_0, c_1, \ldots, c_{M-1}\}$ are stored in M circular buffers 402, one circular buffer for each of the M coefficient positions of the equalizer. During every N-symbol period, the K coefficient values in every circular buffer are cyclically applied to generate K equalizer output signals. Additional control may be necessary to ensure that the sequence of obtained K equalized signals corresponds to the sequence of data symbols defined by $\Psi$ without duplication or omission of symbols.

This is just one exemplary implementation of the time-varying equalizer. Other architectures are possible.

The following discussion will show that when the index set $\Psi$ is a proper set, the time-varying equalizer 114 can suppress strongly impaired spectral regions of aggregate width of up to $(N-K)/(NT)$ hertz while delivering practically zero-ISI signals.

The continuous-time signal at the receive-filter output is $x(t)=\Sigma_n a_n h(t-nT)+v(t)$. Sampling at times $nT+\tau$ yields $$x_n = x(nT + \tau) = \sum_\ell h_\ell a_{n-\ell} + v_n, \quad (2)$$

where $$h_\ell = h(\ell T + \tau) \quad (3)$$

$$= \int H(f) e^{j2\pi f(\ell T + \tau)} df;$$

$$H(f) = H_T(f) G(f) G_R(f),$$

$$E\{\bar{v}_n v_{n+\ell}\} = \int V(f) e^{j2\pi f \ell T} df; \; V(f) = N(f)|G_R(f)|^2. \quad (4)$$

Hereinafter, 1/T-periodic spectral functions are denoted with a tilde and considered in the Nyquist band $f \in [0, 1/T)$, rather than $[-1/2T, +1/2T)$. The 1/T-periodic spectral symbol response $\tilde{H}(f)$ and the power spectral density of the noise $\tilde{V}(f)$ are:

$$\tilde{H}(f) = \sum_\ell h_\ell e^{-j2\pi f \ell T} = \frac{1}{T}\sum_i H(f+i/T)e^{j2\pi(f+i/T)\tau}, \ f \in [0, 1/T), \quad (5)$$

$$\tilde{V}(f) = \sum_\ell E\{\bar{v}_n v_{n+\ell}\} e^{-j2\pi f \ell T} = \frac{1}{T}\sum_i V(f+i/T), \ f \in [0, 1/T). \quad (6)$$

The equalizer is a time-varying FIR filter operating on the T-spaced sequence $\{x_n\}$ with K sets of coefficients $\{d_\ell^{(k)}\}$, $k \in \Psi$. The K symbol responses at the K equalizer outputs are:

$$\forall k \in \Psi: s_\ell^{(k)} = \sum_{\ell'} d_{\ell'}^{(k)} h_{\ell-\ell'} = \quad (7)$$

$$\int_0^{1/T} \tilde{H}(f)\tilde{D}^{(k)}(f) e^{j2\pi f \ell T} df = \int_0^{1/T} \tilde{S}^{(k)}(f) e^{j2\pi f \ell T} df,$$

where $$\forall k \in \Psi: \tilde{D}^{(k)}(f) = \sum_\ell d_\ell^{(k)} e^{-j2\pi f \ell T}, \ f \in [0, 1/T), \quad (8)$$

$$\forall k \in \Psi: \tilde{S}^{(k)}(f) = \sum_\ell s_\ell^{(k)} e^{-j2\pi f \ell T} = \tilde{H}(f)\tilde{D}^{(k)}(f), \ f \in [0, 1/T). \quad (9)$$

In the absence of noise, the K outputs of the equalizer in the i-th N-symbol period are given by $$\forall k \in \Psi: y_{iN+k} = \sum_\ell d_\ell^{(k)} x_{iN+k-\ell} = \sum_{k-\ell \bmod N \in K} s_\ell^{(k)} a_{iN+k-\ell}. \quad (10)$$

The second summation in (10) accounts for data symbols only, i.e., null symbols are excluded.

The following discussion addresses the conditions for zero intersymbol interference (ISI) at the equalizer output. In a subdimensional SCM system with a rate of K/N, ISI-free transmission can be accomplished within a minimal one-sided bandwidth of K/NT Hz. Available choices for spectral suppression in the Nyquist bandwidth 1/T Hz will be examined. Absence of noise is assumed.

Zero ISI requires $y_{iN+k} = a_{iN+k}$, $k \in \Psi$. From Equation (10), the time-domain conditions for zero-ISI are:

$$\forall k \in \Psi: s_\ell^{(k)} = \begin{cases} \delta_\ell & \text{if } (k-\ell \bmod N) \in \Psi \\ u_\ell^{(k)} & \text{if } (k-\ell \bmod N) \notin \Psi \end{cases}. \quad (11)$$

In Equation (11), $\delta_l$ is the Kronecker indicator function, defined as being equal to zero for all $l \neq 0$ and equal to 1 for $l=0$. The values of $u_l^{(k)}$ can be arbitrary.

The following shows the values of the symbol responses $s_l^{(k)}$ for the example where N=4, K=3, $\Psi=\{0,1,2\}$.

The ambiguity of the symbol responses in the locations of the $u_l^{(k)}$'s implies spectral redundancy. The nature of this redundancy will become apparent by expressing the fixed part of Equation (11), i.e., the upper part in Equation (11), in frequency-domain terms.

It is appropriate to divide the Nyquist band [0, 1/T) into N subbands [l/NT, (l+1)/NT), l=0,1, ... N-1, and denote the spectral symbol responses in these subbands of equal width 1/NT by:

$$\forall k \in \Psi, l = 0, 1, \ldots N-1: S_l^{(k)}(f) = \tilde{S}^{(k)}(f' + l/NT), f' \in [0, 1/NT). \quad (12)$$

With $l = k - k' + iN$, $k' \in \Psi$, the fixed part of Equation (11) is written as:

$$\forall k \in \Psi, k' \in \Psi: \sum_i s_{k-k'+iN}^{(k)} e^{j2\pi f(k-k'+iN)T} = \delta_{k-k'}. \quad (13)$$

Substitution of $$s_{k-k'+iN}^{(k)} = T\int_0^{1/T} \tilde{S}^{(k)}(f) e^{j2\pi f(k-k'+iN)T} df = \quad (14)$$

$$T\sum_{l=0}^{N-1} \int_0^{1/NT} S_l^{(k)}(f') e^{j2\pi(f'+l/NT)(k-k'+iN)T} df'$$

into Equation (13) yields the zero-ISI conditions in the frequency-domain form:

$$\forall k \in \Psi, k' \in \Psi: \sum_{l=0}^{N-1} S_l^{(k)}(f') e^{j2\pi l(k-k')/N} = N\delta_{k-k'}, f' \in [0, 1/NT). \quad (15)$$

The trivial solutions of (15) are $S_l^{(k)}(f')=1$ for all $l = \{0, 1, 2, \ldots N-1\}$. This corresponds to the well-known Nyquist criterion $\tilde{S}^{(k)}(f) = \tilde{H}(f)\tilde{D}^{(k)}(f)=1$ for zero-ISI in unconstrained successions of modulation symbols (K=N). This solution is achievable with $\tilde{D}^{(k)}(f) = \tilde{H}^{-1}(f)$, if $\tilde{H}(f)$ exhibits spectral support in the entire Nyquist band [0, 1/T). If $\tilde{H}(f)$ does not have full spectral support, or the equalizer has to suppress severe narrowband interference at certain frequencies, then $\tilde{S}^{(k)}(f)$ should vanish in the affected spectral regions.

It will be shown that solutions of Equation (15) exist with $S_l^{(k)}(f) \neq 0$, $l \in L$, and $S_l^{(k)}(f) = 0$ (or arbitrary fixed values), $l \notin L$, for all possible $L$:

$$L = \{l_0, l_1, \ldots l_{K-1}: 0 \leq l_i \leq N-1; l_i \neq l_j, i \neq j\}. \quad (16)$$

In other words, $\tilde{S}^{(k)}(f)$ can vanish at any combination of up to N-K frequencies in the set of frequencies $\{f = f' + l/NT, l = 0, 1, 2, \ldots N-1\}$, for every frequency $f' \in [0, 1/NT)$. The sup-

| $\ell$: | ... | -7 | -6 | -5 | -4 | -3 | -2 | -1 | 0 | 1 | 2 | 3 | 4 | 5 | 6 | 7 | 8 | 9 | ... |
|---|---|---|---|---|---|---|---|---|---|---|---|---|---|---|---|---|---|---|---|
| $s_\ell^{(0)}$: | ... | $u$ | 0 | 0 | 0 | $u_{-3}^{(0)}$ | 0 | 0 | 1 | $u_1^{(0)}$ | 0 | 0 | 0 | $u$ | 0 | 0 | 0 | $u$ | ... |
| $s_\ell^{(1)}$: | ... | 0 | $u$ | 0 | 0 | 0 | $u_{-2}^{(1)}$ | 0 | 1 | 0 | $u_2^{(1)}$ | 0 | 0 | 0 | $u$ | 0 | 0 | 0 | ... |
| $s_\ell^{(2)}$: | ... | 0 | 0 | $u$ | 0 | 0 | 0 | $u_{-1}^{(2)}$ | 1 | 0 | 0 | $u_3^{(2)}$ | 0 | 0 | 0 | $u$ | 0 | 0 | ... | pression of (N−K)/NT Hz in not necessarily connected bands is illustrated in FIG. 2A and FIG. 2B by several examples (discussed above).

Let $k \in \Psi$ and $S_l^{(k)}(f)=0$, $l \notin L$. Then, with $\alpha_N = e^{j2\pi/N}$, Equation (15) can be written as a system of K linear equations for K unknowns:

$$A_{K \times K}(L, \Psi) \times \begin{bmatrix} \alpha \alpha_N^{-l_0 k} S_{l_0}^{(k)}(f') \\ \alpha \alpha_N^{-l_1 k} S_{l_1}^{(k)}(f') \\ \vdots \\ \alpha \alpha_N^{-l_{K-1} k} S_{l_{K-1}}^{(k)}(f') \end{bmatrix} = N \begin{bmatrix} \delta \delta_{k-k_0} \\ \delta \delta_{k-k_1} \\ \vdots \\ \delta \delta_{k-k_{K-1}} \end{bmatrix}, \quad (17)$$

and $$A_{K \times K}(L, \Psi) = \begin{bmatrix} \alpha \alpha_N^{-l_0 k_0} & \alpha \alpha_N^{-l_1 k_0} & \alpha \alpha_N^{-l_2 k_0} & \cdots & \alpha \alpha_N^{-l_{K-1} k_0} \\ \alpha \alpha_N^{-l_0 k_1} & \alpha \alpha_N^{-l_1 k_1} & \alpha \alpha_N^{-l_2 k_1} & \cdots & \alpha \alpha_N^{-l_{K-1} k_1} \\ \alpha \alpha_N^{-l_0 k_2} & \alpha \alpha_N^{-l_1 k_2} & \alpha \alpha_N^{-l_2 k_2} & \cdots & \alpha \alpha_N^{-l_{K-1} k_2} \\ \vdots & \vdots & \vdots & \vdots \\ \alpha \alpha_N^{-l_0 k_{K-1}} & \alpha \alpha_N^{-l_1 k_{K-1}} & \alpha \alpha_N^{-l_2 k_{K-1}} & \cdots & \alpha \alpha_N^{-l_{K-1} k_{K-1}} \end{bmatrix}. \quad (18)$$

The K×K matrix $A_{K \times K}(L, \Psi)$ is a submatrix of the N×N transformation matrix of an N-point DFT.

For a solution of (17) to exist, $A_{K \times K}(L, \Psi)$ must be non-singular, i.e. $\det(A_{K \times K}(L, \Psi)) \neq 0$. All elements of the solution vector must then be non-zero. If $A_{K \times K}(L, \Psi)$ is non-singular for all possible sets L, then $\Psi$ is called a "proper set".

Only sets $L_0$ with $l_0=0$ need to be tested, because dividing the elements in every row of $A_{K \times K}(L, \Psi)$ by the first row element does not change the matrix rank. Similarly, only sets $\Psi_0$ with $k_0=0$ need to be examined. Adding a non-zero integer value c modulo N to all elements of a set $\Psi_0$ gives an equivalent set $$\Psi = \Psi_0 + c \bmod N \text{ (denoted as } \Psi \stackrel{c}{\equiv} \Psi_0\text{)},$$

corresponding to a situation where the N-periods are shifted by c.

Two sufficient conditions for a proper set $\Psi_0$ are (as stated previously):
1. $\Psi_0 = \{k_i = i\Delta\Delta \bmod N, i=0,1,2,\ldots K-1\}$, $\gcd(\Delta, N)=1$. In this case, the set $\Psi_0$ is called "proper sequential")
2. N is a prime number.

While certain exemplary embodiments have been described in detail and shown in the accompanying drawings, it is to be understood that such embodiments are merely illustrative of and not restrictive on the broad invention. It will thus be recognized that various modifications may be made to the illustrated and other embodiments of the invention described above, without departing from the broad inventive scope thereof. It will be understood, therefore, that the invention is not limited to the particular embodiments or arrangements disclosed, but is rather intended to cover any changes, adaptations or modifications which are within the scope and spirit of the invention as defined by the appended claims.

What is claimed is:

1. A method for providing communications in a single-carrier modulation (SCM) system, the SCM system including a transmitter and a receiver, the method comprising:

inserting null symbols, by the transmitter of the SCM system, in a transmit sequence of data symbols such that a specified pattern of K data symbols and N−K null symbols is formed in every period of N symbols in the transmit sequence, N and K being positive integers and K being smaller than N;

converting, by the transmitter of the SCM system, the transmit sequence into an analog signal;

transmitting, by the transmitter, the analog signal over a channel;

converting, by the receiver of the SCM system, the analog signal into a receive sequence; and equalizing the receive sequence using a time-varying equalizer of the receiver, the time-varying equalizer having K sets of coefficients, each of the K sets of coefficients being used cyclically.

2. The method according to claim 1, comprising:

producing notches, by the transmitter, in a spectrum of the analog signal at predetermined frequency bands prior to transmitting the analog signal over the channel.

3. The method of claim 2, wherein the notches comprise an aggregate bandwidth of not greater than ((N−K)/N)×(1/T), wherein 1/T is a Nyquist bandwidth, and wherein the equalized receive sequence is substantially free of intersymbol interference (ISI).

4. The method of claim 3, wherein the aggregate bandwidth of the notches comprises a plurality of non-contiguous regions.

5. The method of claim 3, wherein the aggregate bandwidth of the notches comprises a contiguous region.

6. The method of claim 1, wherein the equalizing the receive sequence comprises swapping each of the K sets of coefficients in and out of a plurality of circular buffers to equalize the receive sequence, and wherein the K sets of coefficients are stored in the plurality of circular buffers.

7. The method of claim 1, wherein the specified pattern is replaced by a second pattern, the specified pattern defining a K-dimensional subspace of the N-dimensional signal space, the second pattern specifying a rotated version of the K-dimensional subspace, the rotation being obtained by transforming N-dimensional signal vectors in the K-dimensional subspace by an N×N unitary matrix.

8. The method of claim 1, wherein the K sets of coefficients is being used cyclically by the time-varying equalizer in accordance with an index set.

9. The method of claim 1, wherein the inserting of null symbols in a transmit sequence of data symbols is performed by a modulator of the transmitter.

10. The method of claim 9, wherein the modulator accepts information bits at its input and maps the information bits into the data symbols.

11. The method of claim 1, wherein the converting of the analog signal into a receive sequence is performed by a sampler of the receiver.

12. The method of claim 1, wherein the analog signal is transmitted over twisted-pair lines.

13. The method of claim 1, wherein the analog signal is transmitted over a cable system.

14. The method of claim 1, wherein the analog signal is transmitted over a wireless communication system.

15. The method of claim 1, wherein the SCM system is a subdimensional SCM system.

16. A method for providing communications in a single-carrier modulation (SCM) system, the method comprising:
    inserting null symbols, by a transmitter of the SCM system, in a transmit sequence of data symbols such that a specified pattern of K data symbols and N−K null symbols is formed in every period of N symbols in the transmit sequence, N and K being positive integers and K being smaller than N; and
    replacing, by the transmitter of the SCM system, the specified pattern by a second pattern, the specified pattern defining a K-dimensional subspace of the N-dimensional signal space, the second pattern specifying a rotated version of the K-dimensional subspace, the rotation being obtained by transforming N-dimensional signal vectors in the K-dimensional subspace by an N×N unitary matrix.

17. The method of claim 16, wherein the inserting of null symbols is performed by a modulator of the transmitter.

18. The method of claim 17, wherein the replacing of the specified pattern by the second pattern is performed by the modulator.

19. The method of claim 17, wherein the modulator accepts information bits at its input and maps the information bits into the data symbols.

20. The method of claim 16, comprising:
    equalizing, by a receiver of the SCM system, a receive sequence corresponding to the transmit sequence.

21. The method of claim 20, wherein the equalizing is performed by a time-varying equalizer of the receiver, wherein the time-varying equalizer has K sets of coefficients, and wherein each of the K sets of coefficients is used periodically.

22. The method of claim 16, wherein the transmitter transmits over twisted-pair lines.

23. The method of claim 16, wherein the transmitter transmits over a cable system.

24. The method of claim 16, wherein the transmitter transmits over a wireless communication system.

* * * * *